United States Patent [19]

Neuman

[11] 3,784,248

[45] Jan. 8, 1974

[54] COMBINATION MOBILE SHELTER AND SEPARABLE RECREATIONAL EQUIPMENT CARRYING TRAILER

[75] Inventor: Richard L. Neuman, Houston, Tex.

[73] Assignee: The Laitram Corporation, New Orleans, La. ; a part interest

[22] Filed: Aug. 7, 1972

[21] Appl. No.: 278,233

[52] U.S. Cl. ............................................. 296/23 B
[51] Int. Cl. ............................................... B60p 3/32
[58] Field of Search ................................. 296/23 B

[56] References Cited
UNITED STATES PATENTS
2,847,136   8/1958   Neff ................................. 296/23 B
3,116,949   1/1964   Muse ............................... 296/23 B
3,193,321   7/1965   Rose ................................ 296/23 B Primary Examiner—Philip Goodman
Attorney—Wilkinson, Mawhinney & Theibault

[57] ABSTRACT

The present disclosure is directed to a load carrying trailer which is removably coupled to and transported within a shelter trailer wherein both are attached to a vehicle and pulled by a central draft beam on the first trailer, or if desired, trailered separable by means of secondary hitch; and because of their compactability, lend themselves to providing a mobile shelter for living within when arriving at a shelter site and permitting transport of a powered water-borne craft or motor vehicle on a load carrying trailer to and from the scene of recreational activity without having to disturb the shelter trailer.

5 Claims, 11 Drawing Figures

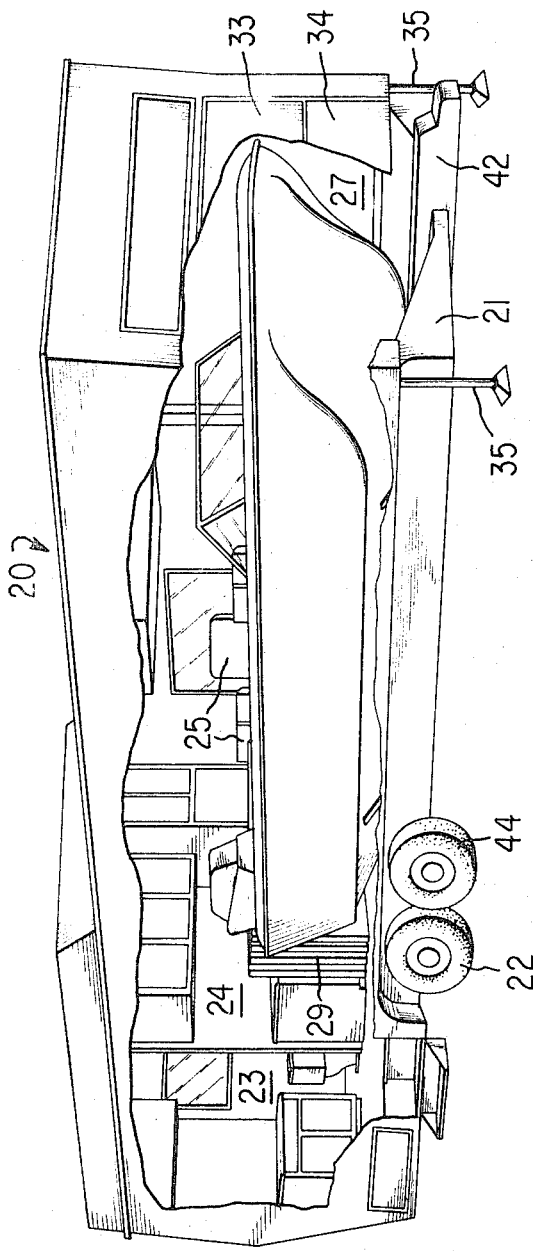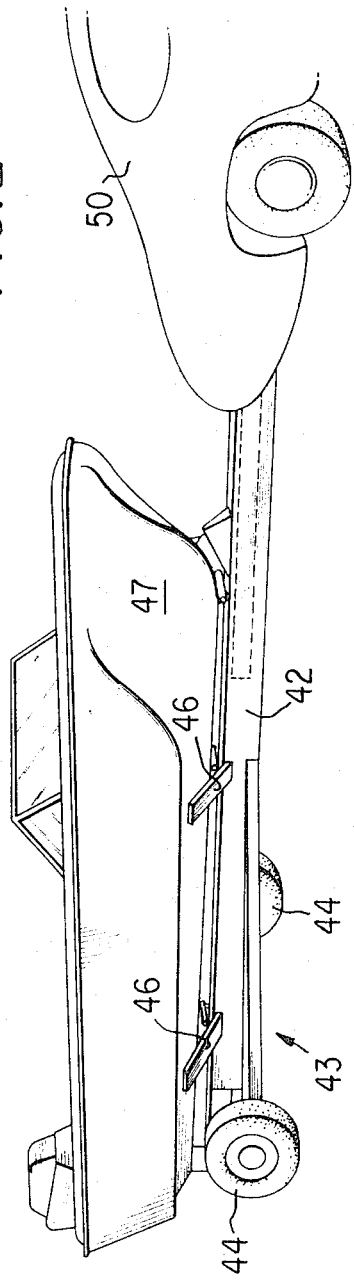

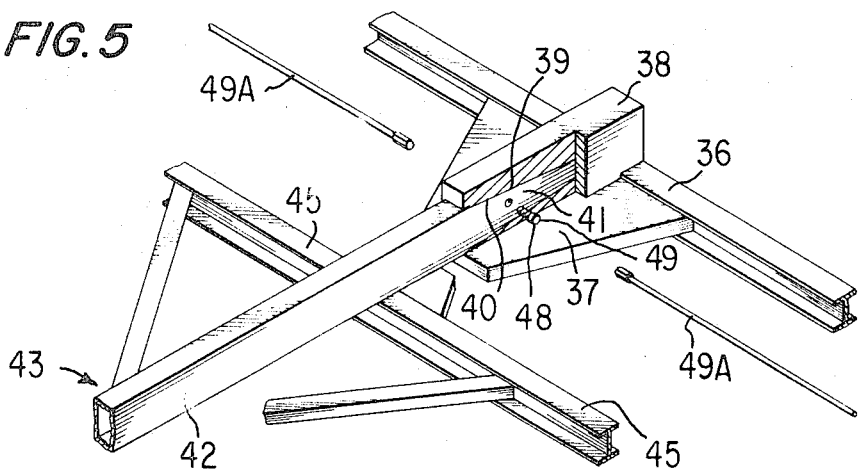
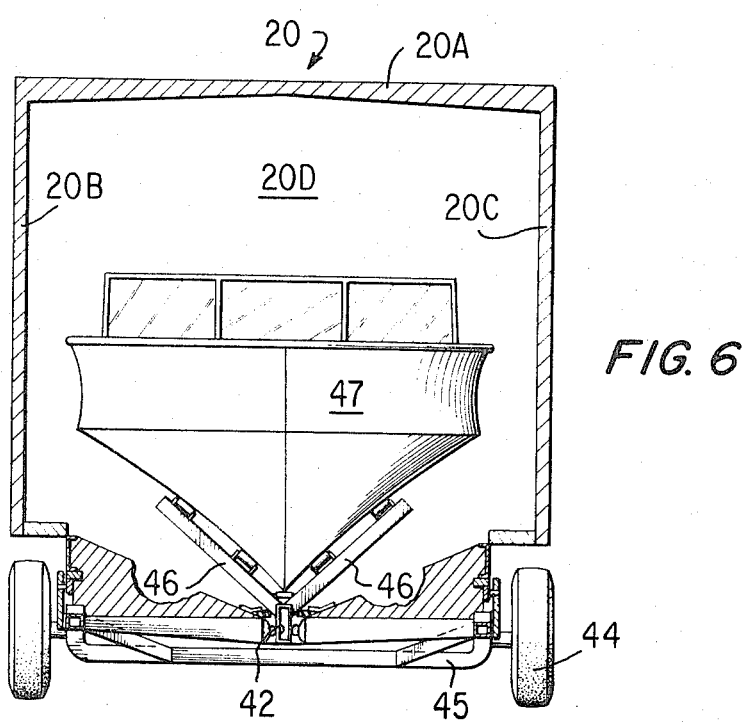

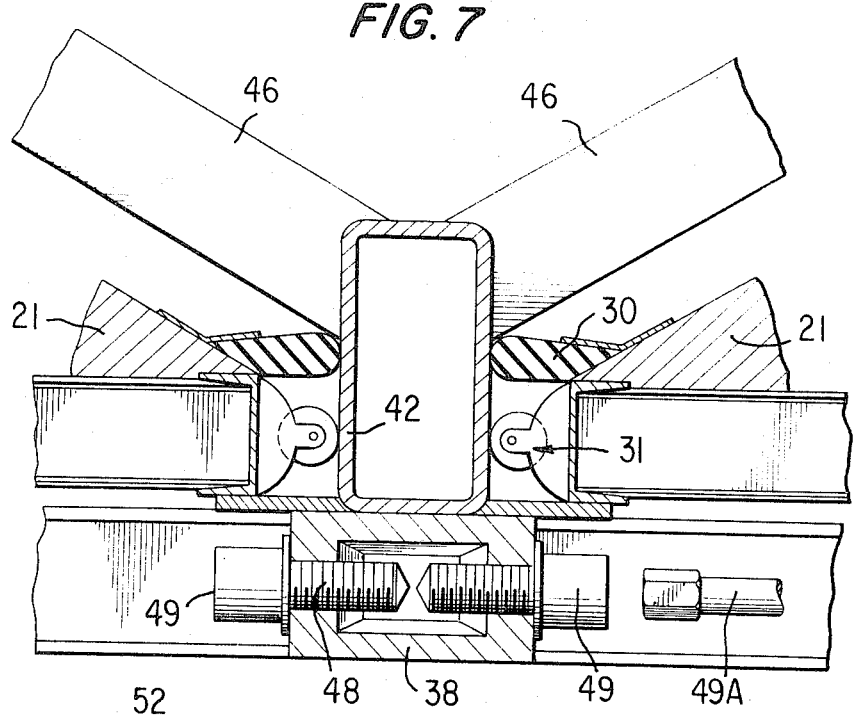
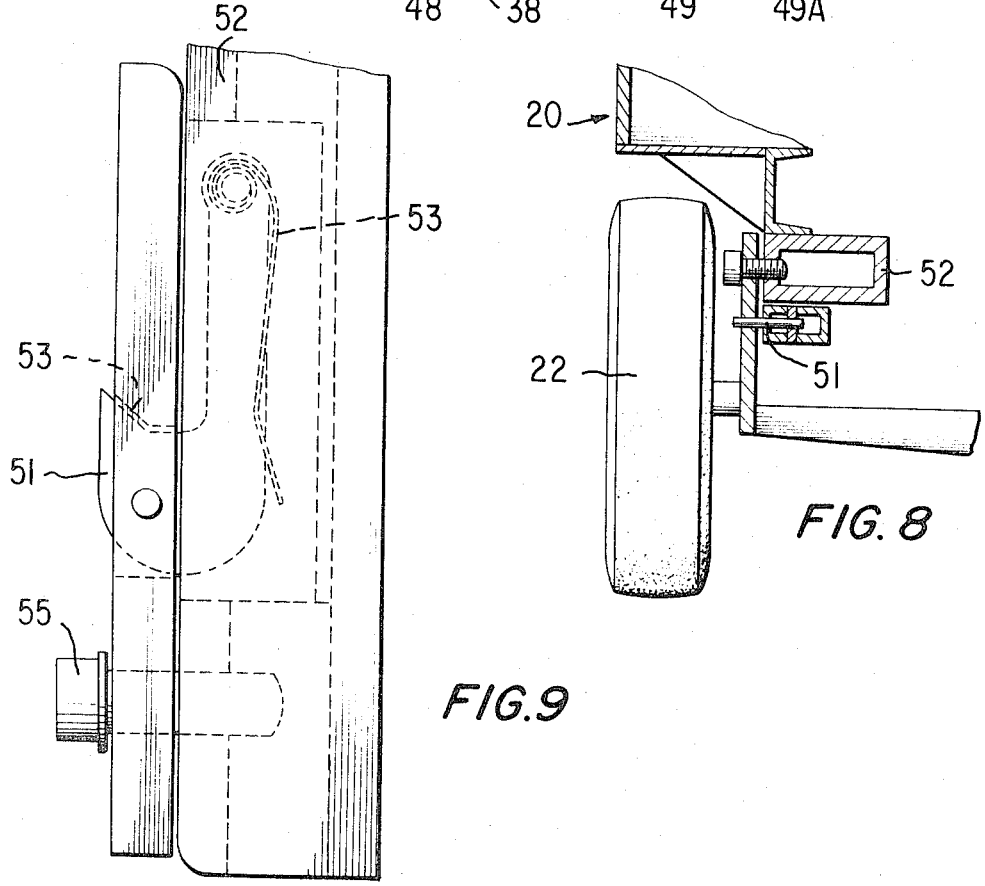

COMBINATION MOBILE SHELTER AND SEPARABLE RECREATIONAL EQUIPMENT CARRYING TRAILER

An object of the invention is to provide two trailers for different purposes within a compact single trailerable vehicle which can be easily towed by an ordinary motor vehicle, without having to tow a plurality of trailers which many states will not permit.

A further object of the present invention is to provide a complete self-contained mobile shelter trailer with living, dining and bedroom furniture of which can be folded or hinged against or into the outer walls so that the folded or transversely hinged floor sections can be nested compactly and locked in place to the area of the shelter trailer axle to stabilize the center of gravity while coupling and uncoupling and trailering the combination mobile shelter and load carrying separable trailer.

Another object of the present invention is the use of the central draft beam of the separable load carrying trailer which incorporates a tapered extension which cooperates with a self-aligning unitizing arrangement being a part of the shelter trailer which provides a compact and strong central draft line for both the mobile shelter and separable load carrying trailer.

Still another object of the present invention is the use of the secondary bottom of the mobile shelter which incorporates a self-aligning draft beam slot with bearing surfaces that extends from the extreme fore end of the shelter to a point forward of the axle of the shelter. The self-aligning slot permits the load carrying separable trailer to be inserted into the mobile shelter eliminating manual alignment of the mobile shelter.

In addition to the aforementioned objects of the invention is still another object which is a replaceable environmental seal attached to the exterior of the diagonal facing above inside of the aforementioned draft beam self-aligning slot of the mobile shelter which minimizes outside environmental conditions to penetrate the interior of the mobile shelter while the shelter is being trailered while in combination with the separable load carrying trailer.

Still further objects and advantages of the invention will appear as the description proceeds.

To the accomplishment of the foregoing and related ends, the invention consists of the shelter and sporting equipment hereinafter fully described and particularly pointed out in the claims, the annexed drawings and following description setting forth in detail certain means for carrying out the invention, such disclosed means illustrating however but two of various ways in which the principle of the invention may be used.

With the foregoing and other objects in view the invention will be more fully described hereinafter and more particularly pointed out in the appended claims.

In the drawings in which like parts are denoted by reference characters throughout the several views:

FIG. 1 is a perspective view of the combined shelter and separable trailer with parts broken away to show the boat on the separable trailer nested within the mobile shelter trailer.

FIG. 2 is a perspective view of the separable boat trailer and boat removed from the transport condition of FIG. 1.

FIG. 5 is a fragmentary perspective view of the union between the two trailers showing the central draft or pull arrangement.

FIG. 6 is a transverse section through the combined trailers of FIG. 1.

FIG. 7 is a fragmentary transverse sectional view taken at an enlarged scale showing the central draft beam and trailer union.

FIG. 8 is a fragmentary transverse sectional view taken at an enlarged scale showing the front trailer frame structure locking device.

FIG. 9 is a top plan view of the front locking device of FIG. 8 with parts shown in dash lines.

Figure 3:
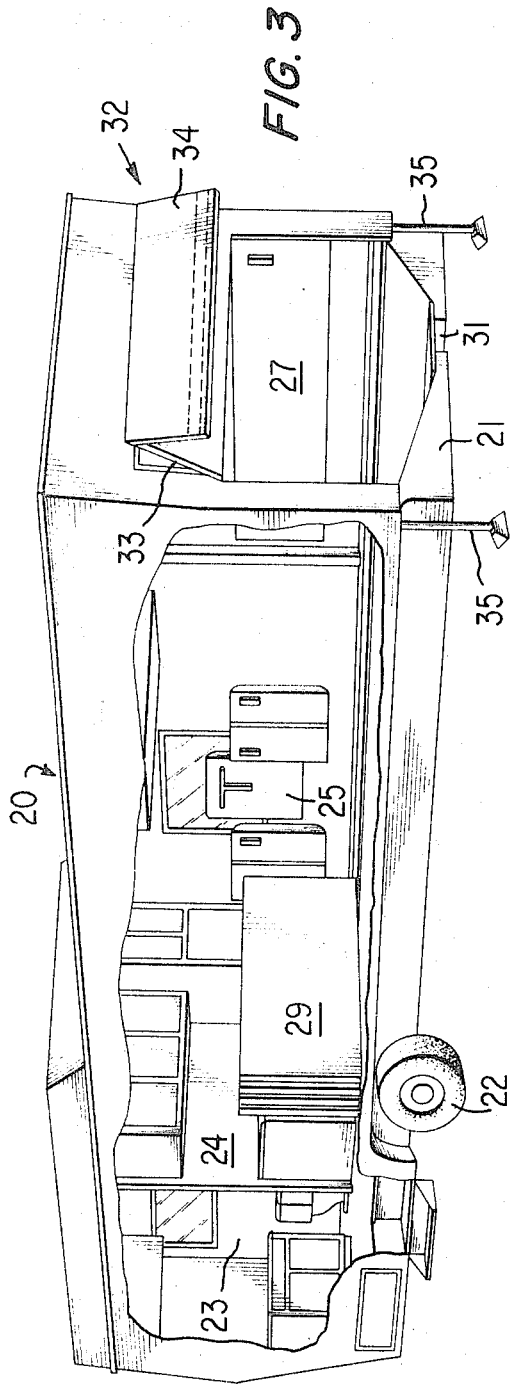
FIG. 3 is a perspective view of the mobile shelter trailer of the present invention with the floor up in ready for transport condition to receive or to have discharged the boat and its trailer.
Figure 4:
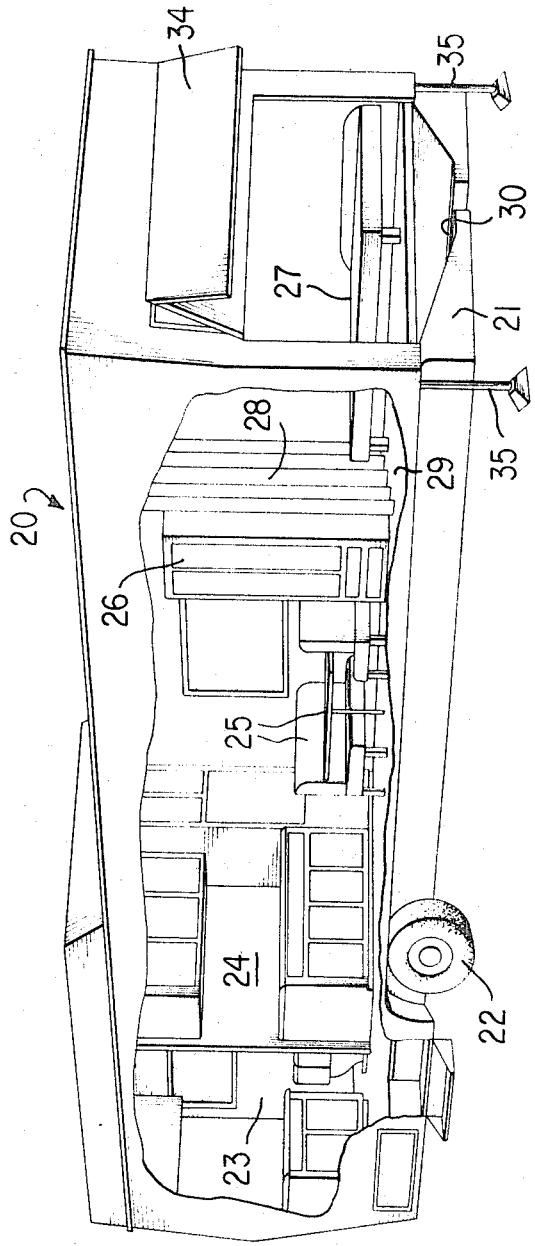
FIG. 4 is a perspective view of the mobile shelter trailer in its set up livable condition with the floor down dining room and bedroom set up for living.

Referring now to FIGS. 3 and 4, 20 designates generally a shelter trailer having a base frame 21, wheels 22, bathroom facilities 23, kitchen facilities 24, dining table and booth 25, closet 26, a double bed 27, bi-fold curtain 28 and a floor 29 made up of bi-fold sections, which, when the bed, closet and dining area are folded up as shown in FIG. 3, will nest compactly to the rear of wheels 22 against the kitchen area. Below the floor area is a lower floor area and environmental seal 30 which has an elongated slot 31 to accommodate the boat frame guide. The front end 32 of the shelter trailer has bi-fold hinged doors 33, 34 which will permit entry of the boat and trailer. In the condition illustrated in FIGS. 3 and 4 the concealed jacks 35 are in their down position with the shelter trailer 20 in a level attitude with the interior rigged for living as shown in FIG. 4.

As shown in FIG. 5 the rear axle frame 36 of the trailer 20 has a plate 37 upon which is mounted a unitizing arrangement 38 which has walls 39 tapered to conform to the flat surfaces 40 of a tapered extension 41 carried by the end of a central draft beam 42 of a boat or vehicle trailer 43 which has transport wheels 44 mounted in axle beam 45. Upstanding from the draft beam 42 is a boat cradle 46 for receiving and supporting a boat 47. As shown in FIG. 7, when the boat trailer 43 is within the habitat or dwelling trailer 20 the environmental seal 30 seats against the central draft beam 42 to protect the interior of trailer 20 from dust, dirt, water or other foreign material thrown up from the road incident to transport of the two trailers in their nested condition of FIG. 1 with the bi-fold floor 29 in the up or retracted condition. As shown in FIG. 7 the draft beam 42 slides between roller bearings to eliminate binding as the boat trailer is moved into and out of the dwelling trailer. Threaded locking bolts 48 having for example hexogonal socketed heads 49 are received through the walls of the unitizing block 38 and the tapered extension 41 of the draft beam 42 and locked in place by wrenches 49A to lock the axles of the two trailers 20, 43 together so that both are drafted simultaneously by draft beam 42 which has at its front end a conventional trailer hitch for coupling to an automobile 50.

As shown in FIGS. 8 and 9 the two trailers are also linked together by a frame locking device which comprises a pivoted latch 51 carried by a beam 52 on trailer 20 which latch is spring loaded by spring 53 to the seated or locked condition of FIGS. 8 and 9. The latch 51 passes through an opening 54 in the frame of the boat or vehicle trailer 43. A locking pin 55 may be employed to preserve the coupling between two trailers only it will be understood that two such constructions are employed, one for each side. Additional locking bolts 56 may be employed for safety if desired.

As shown in FIG. 6, the shelter or habitat trailer 20 has a roof 20A and side walls 20B and 20C as well as a rear end wall 20D.

Figure 10:
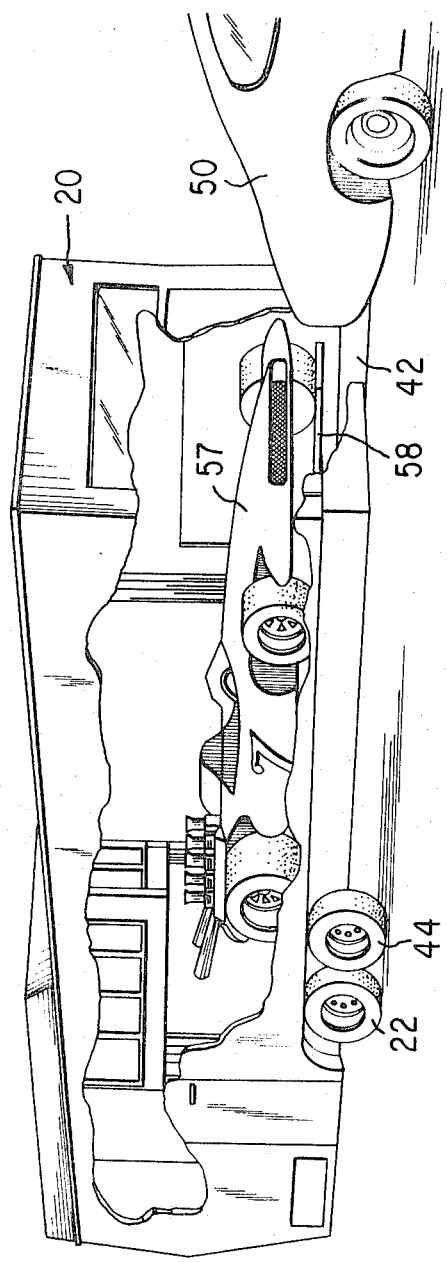
FIG. 10 is a perspective view of a combined mobile shelter trailer and separable trailer wherein the separable trailer transports a race car.
Figure 11:
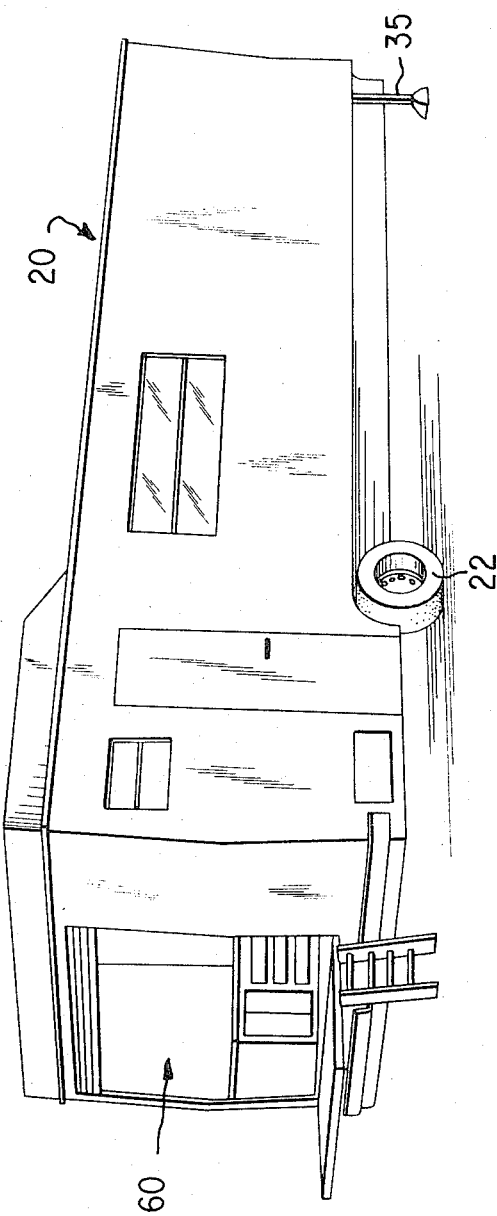
FIG. 11 is a rear perspective view of the mobile shelter trailer of FIG. 10.

When it is desired to transport a racing or other vehicle 57 in lieu of a boat 47, a vehicle carrier bed 58 and loading ramp 59 may replace the boat cradle 46 as shown in FIGS. 10 and 11. The rear of the trailer 20 shown in FIG. 11 may be modified as a service and work shop 60 for the racing car 57. The two trailers of FIGS. 10 and 11 are in all other respects similar to the trailers of FIGS. 1 through 9.

When it is desired to take both the boat trailer and habitat trailer on a trip the boat 47 is first placed upon the boat cradle 46 and the draft beam 42 is coupled to the vehicle 50 as by a conventional trailer coupling. With the concealed jacks 35 in the down position shown in FIG. 1 the vehicle, rear boat trailer 43 and boat 47 are backed into the habitat trailer 20 after all of the tables and seats have been folded flat against or into the wall as shown in FIG. 3. The bed and bi-fold curtain 29 is likewise in a flat against or into the wall position and the bi-fold flooring 29 has been moved to the rear as shown in FIG. 3. This weight mass of the bi-fold floor 29 as shown in FIG. 3 adds a counterweight to the rear of the axle of wheels 22 which will permit easier handling and movement of the trailer 20 when raising or lowering same about the forward end of the trailer 20. The central draft beam 42 of the trailer passes through the elongated slot 31 at the bottom of the trailer 20 such that the boat and trailer are received within the confines of the habitat trailer 20 as shown in FIG. 1. As this situation occurs the tapered rear extension 41 mates with the axle unitizing mechanism 38 and the locking devices 48 are put in place by the wrenches 49A. Also the latch device 51 seats in opening 53 in the boat or vehicle trailer frame construction as shown in FIGS. 8 and 9. This happens on each side of the trailer and when both latch devices 51 have seated in the openings 53 and the securing mechanism 55 are put in place as well as locking devices 48 the unit is then mechanically coupled for over the highway transport as a single mobile unit as shown in FIG. 1. The doors 33, 34 are then closed and the unit is taken down the highway as a single trailer unit. When the camp site or recreational area is reached the units are uncoupled after the jacks 35 have been lowered and fixed and upon removal of the locking devices 48 and 55 and opening of the doors 33, 34 the boat trailer and boat are removed from the habitat trailer and at that time the habitat trailer has its bi-fold floors 29 lowered to the floor position of FIG. 4 and all of the fold down equipment is placed in the lowered position of FIG. 4 for living as a dwelling.

When it is desired to carry a race car or other recreational vehicle other than the boat the construction is substantially identical except for the change of a vehicle bed for a boat cradle and the rear portion of the trailer 20 as shown in FIGS. 10 and 11 may be modified to provide a machine work and service area for preparation and servicing of the race car.

What is claimed is:

1. Transportable recreational equipment comprising, in combination, two separable wheeled trailers, one of which comprises an elongated frame adapted to be attached by it's draft end to a motor vehicle, the second trailer being an independently fabricated rigid construction habitat so constructed as to be supported on said second trailer and permanently attached thereto, said second trailer having walls, floor and roof, said walls extending beyond the outer perimeter of said elongated frame of the first trailer and permanently attached to said roof structure and frame structure of said second trailer, and means coacting between said trailers for detachably connecting said second trailer to said first trailer, whereby said second trailer may be separated as an independent unit from said first trailer, said detachable connecting means comprising an axle locking device and a frame locking device, and removable locking pin means in combination with spring actuated alignment locking devices, whereby said removable locking pin means and devices form a part of and are permanently attached to one of said trailers.

2. A combination mobile shelter and separable trailer comprising a first trailer having a central draft beam supported proximate its rear on an axle having two wheels, a coupling extension on said beam extending rearwardly of said axle, load support means extending upwardly from said central draft beam, a second trailer having an axle supported on two wheels and secured proximate the rear of a frame for said second trailer, said second trailer having flooring of hinged bi-fold sections arranged with the axis of the hinges transversely of the trailer so that the sections fold compactly rearwardly of the wheel axle of said second trailer and kitchen and bedroom furniture fold against and into outer walls to clear the inner part of said second trailer to accommodate said first trailer with its vehicular load, and a unitizing means secured to the axle of said second trailer and adapted to receive the coupling extension of the beam within the means, and means locking the extension within the unitizing means and securing the two trailers as one with the load of said first trailer housed within said second trailer and both being pulled by the draft beam of said first trailer.

3. A combination mobile shelter and separable trailer comprising a first trailer having a central draft beam supported proximate its rear on an axle having two wheels, a coupling extension on said beam extending rearwardly of said axle, load support means extending upwardly from said central draft beam, a second trailer having an axle supported on two wheels and secured proximate the rear of a frame for said second trailer, a unitizing means secured to the axle of said second trailer and adapted to receive the coupling extension of the beam within the means, overlapping slidable engaging means between the first and second trailer with mechanical actuated securing devices for locking side structural members of said trailers together, and means locking the extension within the unitizing means and securing the two trailers as one with the load of said first trailer housed within said second trailer and both being pulled by the draft beam of said first trailer.

4. A combination mobile shelter and separable trailer comprising a first trailer having a central draft beam supported proximate its rear on an axle having two wheels, a coupling extension on said beam extending rearwardly of said axle, load support means extending upwardly from said central draft beam, a second trailer having an axle supported on two wheels and secured proximate the rear of a frame for said second trailer, a unitizing means secured to the axle of said second trailer and adapted to receive the coupling extension of the beam within the means, and means locking the extension within the unitizing means, said locking means comprising uniform seated helical ridged devices, permitting close couple securing of the draft beam of said first trailer and unitizing means and securing the two trailers as one with the load of said first trailer housed within said second trailer and both being pulled by the draft beam of said first trailer.

5. A combination mobile shelter and separable trailer comprising a first trailer having a central draft beam supported proximate its rear on an axle having two wheels, a coupling extension on said beam extending rearwardly of said axle, load support means extending upwardly from said central draft beam, a second trailer having an axle supported on two wheels and secured proximate the rear of a frame for said second trailer, a unitizing means secured to the axle of said second trailer and adapted to receive the coupling extension of the beam within the means, means locking the extension within the unitizing means and securing the two trailers as one with the load of said first trailer housed within said second trailer and both being pulled by the draft beam of said first trailer, and an environmental shield carried by each side of the bottom portion of the shelter trailer positioned to bear against the central draft beam to seal out road dust rain water and other foreign matter.

* * * * *